United States Patent
Yamamoto et al.

(10) Patent No.: US 12,034,666 B2
(45) Date of Patent: *Jul. 9, 2024

(54) COMMUNICATION DEVICE AND COMMUNICATION METHOD

(71) Applicant: Panasonic Intellectual Property Corporation of America, Torrance, CA (US)

(72) Inventors: Tetsuya Yamamoto, Kanagawa (JP); Masayuki Hoshino, Kanagawa (JP); Seigo Nakao, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,975

(22) Filed: Aug. 10, 2023

(65) Prior Publication Data

US 2023/0396382 A1  Dec. 7, 2023

Related U.S. Application Data

(63) Continuation of application No. 17/565,313, filed on Dec. 29, 2021, now Pat. No. 11,764,926, which is a (Continued)

(30) Foreign Application Priority Data

Feb. 6, 2015   (JP) ................................ 2015-022168

(51) Int. Cl.
*H04L 5/00* (2006.01)
*H04J 13/18* (2011.01)
(Continued)

(52) U.S. Cl.
CPC ............ *H04L 5/0048* (2013.01); *H04J 13/18* (2013.01); *H04L 5/0051* (2013.01);
(Continued)

(58) Field of Classification Search
CPC ...................................................... H04L 5/0048
See application file for complete search history.

(56) References Cited

U.S. PATENT DOCUMENTS

| | | |
|---|---|---|
| 2013/0114570 A1 | 5/2013 | Park et al. |
| 2013/0195041 A1 | 8/2013 | Papasakellariou et al. |

(Continued)

FOREIGN PATENT DOCUMENTS

| | | |
|---|---|---|
| JP | 2012147134 A | 8/2012 |
| RU | 2324296 C1 | 5/2008 |

(Continued)

OTHER PUBLICATIONS

3GPP TS 36.211 V12.4.0, "Physical channels and modulation (Release 12)", Dec. 2014. (124 pages).

(Continued)

*Primary Examiner* — Christopher M Crutchfield
*Assistant Examiner* — Alan L Lindenbaum
(74) *Attorney, Agent, or Firm* — Seed IP Law Group LLP

(57) ABSTRACT

A base station selects, from among a plurality of code sequences orthogonal to one another, one code sequence by which an uplink signal including a demodulation reference signal repeated in a plurality of subframes is multiplied and transmits, to a terminal for which transmission of the repeated uplink signal is configured, information indicating the selected code sequence by using a field for indicating a cyclic shift and an orthogonal sequence used for the demodulation reference signal. A terminal receives information indicating one of a plurality of code sequences orthogonal to one another using a field for indicating a cyclic shift (Continued)

and an orthogonal sequence used for a demodulation reference signal and multiplies an uplink signal including the demodulation reference signal repeated in a plurality of subframes by the code sequence indicated by the information.

20 Claims, 11 Drawing Sheets

Related U.S. Application Data continuation of application No. 15/467,827, filed on Mar. 23, 2017, now Pat. No. 11,245,502, which is a continuation of application No. PCT/JP2015/006350, filed on Dec. 21, 2015.

(51) Int. Cl.
    *H04L 27/26*     (2006.01)
    *H04W 72/04*     (2023.01)
    *H04W 72/0446*     (2023.01)

(52) U.S. Cl.
    CPC ..... *H04L 27/2607* (2013.01); *H04W 72/0446* (2013.01); *H04L 5/0016* (2013.01)

(56) References Cited

U.S. PATENT DOCUMENTS

| | | | |
|---|---|---|---|
| 2014/0098761 A1 | 4/2014 | Lee et al. | |
| 2014/0254536 A1* | 9/2014 | Pajukoski | H04W 72/0466 370/329 |
| 2015/0036651 A1* | 2/2015 | Takeda | H04W 4/70 370/330 |

FOREIGN PATENT DOCUMENTS

| | | |
|---|---|---|
| WO | WO 9905797 A2 | 2/1999 |
| WO | WO 2013009092 A2 | 1/2013 |
| WO | WO 2013056741 A1 | 4/2013 |

OTHER PUBLICATIONS

3GPP TS 36.212 V12.3.0, "Multiplexing and channel coding (Release12)", Dec. 2014. (89 pages).
3GPP TS 36.213 V12.4.0, "Physical layer procedures (Release12)", Dec. 2014. (225 pages).
3GPP TSG RAN Meeting #65, RP-141660, Ericsson, Nokia Networks, "New WI proposal: Further LTE Physical Layer Enhancements for MTC", Sep. 2014. (8 pages).
3GPP TSG RAN WG1 Meeting #80, R1-150311, Panasonic, "Multiple subframe code spreading for MTC UEs", Feb. 2015. (6 pages).
3GPP TSG RAN WG1 Meeting #82, R1-153969, Panasonic, "Multiple subframe code spreading for MTC UEs", Aug. 2015. (6 pages).
English Translation of Thai Office Action, dated Jun. 15, 2023, for Thai Patent Application No. 1701002246. (6 pages).
Extended European Search Report, dated Dec. 8, 2017, for the related European Patent Application No. 15881040.8-1874 / 3255822. (9 pages).
Extended European Search Report dated Jun. 19, 2019 for the related European Patent Application No. 19154994.8. (11 pages).
Indian Examination Report dated Mar. 23, 2021 for the related Indian Patent Application No. 201747013080. (6 pages).
Indian Examination Report dated Mar. 31, 2021 for the related Indian Patent Application No. 201848045268. (6 pages).
International Search Report of PCT application No. PCT/JP2015/006350 dated Mar. 15, 2016. (2 pages) (with English translation).
LG Electronics, "PUCCH/PUSCH transmission for MTc UEs," R1-150202, Agenda Item: 7.2.1.2.2, 3GPP TSG RAN WG1 Meeting #80, Athens, Greece, Feb. 9-13, 2015. (10 pages).

* cited by examiner

FIG. 7A

| Cyclic Shift Field in uplink-related DCI format [3] | $n_{DMRS,\lambda}^{(2)}$ | | | | $[w^{(\lambda)}(0) \quad w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

FIG. 7B

| MSCI | Multiple-subframe spreading code |
|---|---|
| 000 | #0 (1,1,1,1,1,1,1,1) |
| 001 | #1 (1,-1,1,-1,1,-1,1,-1) |
| 010 | #2 (1,1,-1,-1,1,1,-1,-1) |
| 011 | #3 (1,-1,-1,1,1,-1,-1,1) |
| 100 | #4 (1,1,1,1,-1,-1,-1,-1) |
| 101 | #5 (1,-1,1,-1,-1,1,-1,1) |
| 110 | #6 (1,1,-1,-1,-1,-1,1,1) |
| 111 | #7 (1,-1,-1,1,-1,1,1,-1) |

FIG. 8

| MSCI | Multiple-subframe spreading code | Cyclic shift | OCC |
|---|---|---|---|
| 000 | #0 (1,1,1,1,1,1,1,1) | 0 | [1 1] |
| 001 | #1 (1,-1,1,-1,1,-1,1,-1) | 6 | [1 -1] |
| 010 | #2 (1,1,-1,-1,1,1,-1,-1) | 3 | [1 -1] |
| 011 | #3 (1,-1,-1,1,1,-1,-1,1) | 4 | [1 1] |
| 100 | #4 (1,1,1,1,-1,-1,-1,-1) | 2 | [1 1] |
| 101 | #5 (1,-1,1,-1,-1,1,-1,1) | 8 | [1 -1] |
| 110 | #6 (1,1,-1,-1,-1,-1,1,1) | 10 | [1 -1] |
| 111 | #7 (1,-1,-1,1,-1,1,1,-1) | 9 | [1 1] |

| MSCI | Multiple-subframe spreading code | Cyclic shift | OCC |
|---|---|---|---|
| 000 | #0 (1,1,1,1,1,1,1,1) | 0 | [1 1] |
| 001 | #4 (1,1,1,1,-1,-1,-1,-1) | 6 | [1 -1] |
| 010 | #2 (1,1,-1,-1,1,1,-1,-1) | 3 | [1 -1] |
| 011 | #3 (1,-1,-1,1,1,-1,-1,1) | 4 | [1 1] |
| 100 | #1 (1,-1,1,-1,1,-1,1,-1) | 2 | [1 1] |
| 101 | #5 (1,-1,1,-1,-1,1,-1,1) | 8 | [1 -1] |
| 110 | #7 (1,-1,-1,1,-1,1,1,-1) | 10 | [1 -1] |
| 111 | #6 (1,1,-1,-1,-1,-1,1,1) | 9 | [1 1] |

| MSCI | Multiple-subframe spreading code | Cyclic shift | OCC |
|---|---|---|---|
| 000 | #0 (1,1,1,1) | 0 | [1 1] |
| 001 | #2 (1,1,-1,-1) | 6 | [1 -1] |
| 010 | #1 (1,-1,1,-1) | 3 | [1 -1] |
| 011 | #1 (1,-1,1,-1) | 4 | [1 1] |
| 100 | #0 (1,1,1,1) | 2 | [1 1] |
| 101 | #2 (1,1,-1,-1) | 8 | [1 -1] |
| 110 | #3 (1,-1,-1,1) | 10 | [1 -1] |
| 111 | #3 (1,-1,-1,1) | 9 | [1 1] |

| MSCI | Multiple-subframe spreading code | Cyclic shift | OCC |
|---|---|---|---|
| 00 | #0 (1,1,1,1) | 0 | [1 1] |
| 01 | #2 (1,1,-1,-1) | 6 | [1 -1] |
| 10 | #1 (1,-1,1,-1) | 3 | [1 -1] |
| 11 | #3 (1,-1,-1,1) | 9 | [1 1] |

COMMUNICATION DEVICE AND COMMUNICATION METHOD

BACKGROUND

1. Technical Field

The present disclosure relates to a communication device and a communication method and, in particular, to a base station, a terminal, a transmission method, and a signal spreading method.

2. Description of the Related Art

In 3GPP LTE (3rd Generation Partnership Project Long Term Evolution), OFDMA (Orthogonal Frequency Division Multiple Access) is adopted as a communication method for a downlink from a base station (also referred to as an eNB) to a terminal (also referred to as a UE (User Equipment)). In addition, SC-FDMA (Single Carrier-Frequency Division Multiple Access) is adopted as a communication method for an uplink from a terminal to a base station (refer to, for example, 3GPP TS 36.211 V12.0.0, "Evolved Universal Terrestrial Radio Access (E-UTRA); Physical channels and modulation," December 2014; 3GPP TS 36.212 V12.0.0, "Evolved Universal Terrestrial Radio Access (E-UTRA); Multiplexing and channel coding," December 2014; and 3GPP TS 36.213 V12.0.0, "Evolved Universal Terrestrial Radio Access (E-UTRA); Physical layer procedures," December 2014).

In LTE, a base station performs communication by allocating a resource block (RB) in the system band to the terminal for each unit of time called a subframe. FIG. 1 illustrates an example of a subframe configuration in an uplink shared channel (PUSCH: Physical Uplink Shared Channel). As illustrated in FIG. 1, a subframe is formed from two time slots. In each of the slots, a plurality of SC-FDMA data symbols and a demodulation reference signal (DMRS) are time-multiplexed. Upon receiving the PUSCH, the base station performs channel estimation using the DMRS. Thereafter, the base station demodulates and decodes the SC-FDMA data symbol using the result of channel estimation.

In LTE-Advanced (also referred to as "LTE-A"), which is an expansion of LTE, SU-MIMO (Single User-Multiple Input Multiple Output) is applied to PUSCH in order to improve the use efficiency of the uplink frequency. In SU-MIMO, a terminal can transmit a plurality of uplink data through one PUSCH by spatially multiplexing the data by using a plurality of antennas. The base station receives and separates a plurality of signals simultaneously transmitted from the terminal by using a plurality of antennas.

In addition, MU-MIMO (Multi User-MIMO) is also employed in LTE-A. MU-MIMO is a technology that improves the spectral efficiency. In MU-MIMO, a plurality of terminals transmit data at the same time and at the same frequency, and the base station separates signals transmitted from the plurality of terminals at the same time.

In LTE-A having SU-MIMO and MU-MIMO applied, in order to reduce interference between DMRSs transmitted using the same time/frequency resource, different cyclic shifts are applied to the DMRSs among the terminals, or two DMRSs in the PUSCH are multiplied by different orthogonal codes (OCC: Orthogonal Cover Code) among the terminals so that the plurality of DMRSs are orthogonally multiplexed.

In addition, in the downlink, the base station transmits downlink control information (L1/L2 control information) for informing the terminal of resource allocation for the uplink data. This downlink control information is transmitted from the base station to the terminal by using a downlink control channel, such as PDCCH (Physical Downlink Control Channel), for example. The downlink control information transmitted from the base station in PDCCH is referred to as "DCI (Downlink Control Information)".

When allocating resources for a plurality of terminals to one subframe, the base station transmits a plurality of DC's at the same time. At this time, in order to identify the destination terminal of each of the DCIs, the base station adds, to the DCI, CRC (Cyclic Redundancy Check) bits masked (or scrambled) with the ID of the destination terminal and transmits the DCI. Then, the terminal blind decodes the PDCCH by de-masking (or descrambling) the CRC bits of the DCI with the terminal ID thereof so as to detect the DCI destined for the terminal itself.

The DCI for uplink includes DCI format 0 for indicating one-layer transmission without using SU-MIMO and DCI format 4 for indicating two- or more layer transmission using SU-MIMO. The DCI includes, for example, resource information about a resource allocated to the terminal by the base station (resource allocation information) and MCS (Modulation and Channel Coding Scheme). The terminal controls, for example, the resource and the MCS and transmits the PUSCH on the basis of the detected DCI.

In addition, the DCI for uplink includes information about cyclic shift used for DMRS transmitted on PUSCH and information about OCC (refer to, for example, 3GPP TS 36.212 V12.0.0, "Evolved Universal Terrestrial Radio Access (E-UTRA); Multiplexing and channel coding," December 2014).

Note that in recent years, as a mechanism for supporting the future information society, M2M (Machine-to-Machine) communication which realizes a service through autonomous communication among devices without user intervention has been expected. One of the specific applications of the M2M system is a smart grid. A smart grid is an infrastructure system that efficiently supplies a lifeline such as electricity or gas. For example, in the smart grid, M2M communication is performed between a smart meter installed in each of households or buildings and a central server so that the smart grid controls the demand balance of the resources autonomously and effectively. Other examples of the application of the M2M communication system include a monitoring system for goods management or remote medical care and remote management of inventory and charging of a vending machine.

In the development of the M2M communication system, attention is focused on the use of a cellular system that provides a particularly wide communication area. 3GPP has been studying M2M based on a cellular network in the standardization of LTE and LTE-Advanced with the name of machine type communication (MTC). In particular, 3GPP has been studying "Coverage Enhancement" that further expands the coverage area to support MTC communication devices, such as a smart meter, installed in a blackspot of an existing communication area, such as a basement of a building (refer to, for example, RP-141660, Ericsson, Nokia Networks, "New WI proposal: Further LTE Physical Layer Enhancements for MTC").

In particular, in order to further expand the communication area, MTC coverage enhancement has been studying "Repetition" in which the same signal is transmitted a plurality of times. More specifically, the study of performing repetition transmission on the PUSCH has been conducted. At the base station which is the receiving side of the PUSCH, the reception signal power can be improved by combining the received signals transmitted through reception transmission and, thus, the communication area can be expanded.

In repetition transmission, the same data signal is repeatedly transmitted across a plurality of subframes (that is, time resources). Accordingly, in repetition transmission, the overhead increases, and the frequency usage efficiency decreases. Therefore, when a terminal that performs MTC coverage enhancement (hereinafter also referred to as a terminal in an MTC coverage enhancement mode) performs repetition transmission on PUSCH, the following scheme has been studied (refer to, for example, R1-150311, Panasonic, "Multiple subframe code spreading for MTC UEs"). That is, spreading is performed across the subframes (hereinafter referred to as "multiple-subframe spreading") by multiplying the signals across a plurality of subframes of repetition transmission by an orthogonal code sequence (hereinafter referred to as "multiple-subframe spreading code" or a "multiple-subframe spreading code sequence). Thus, signals of a plurality of terminals can be orthogonally multiplexed across a plurality of subframes in which repetition transmission is performed and, thus, a decrease in the spectral efficiency of PUSCH can be reduced.

When multiple-subframe spreading is applied to the PUSCH, the base station and the terminal need to share the multiple-subframe spreading code to be used in order for the base station to normally detect the signal that is spread and code-multiplexed using the multiple-subframe spreading code.

SUMMARY

One non-limiting and exemplary embodiment facilitates providing a communication device and a communication method capable of sharing a multiple-subframe spreading code to be used between a base station and a terminal.

In one general aspect, the techniques disclosed here feature a communication device including circuitry that selects, from among a plurality of code sequences orthogonal to one another, one code sequence by which an uplink signal including a demodulation reference signal repeated in a plurality of subframes is multiplied and a transmitter that transmits, to a terminal for which transmission of the repeated uplink signal is configured, information indicating the selected code sequence by using a field for indicating a cyclic shift and an orthogonal code used for the demodulation reference signal.

According to the aspect of the present disclosure, a multiple-subframe spreading code to be used can be shared between a base station and a terminal.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7A illustrates an existing DCI field used to indicate a cyclic shift and an OCC used for DMRS of LTE-A;

FIG. 7B illustrates an example of an MSCI for indicating a multiple-subframe spreading code according to the first embodiment;

FIG. 8 illustrates an example of an MSCI for indicating a multiple-subframe spreading code and a cyclic shift and an OCC used for DMRS according to a second embodiment;

DETAILED DESCRIPTION

Underlying Knowledge Forming Basis of the Present Disclosure

In the case of sharing the multiple-subframe spreading code sequence used between a base station and a terminal, the base station can allocate the multiple-subframe spreading code to the terminal on the basis of the determination made by the base station in order to ensure the flexibility of scheduling of the uplink.

However, to simply indicate the multiple-subframe spreading code to the terminal by using existing DCI for uplink, a field used to indicate the multiple-subframe spreading code to the terminal needs to be newly added to the DCI format. For example, when the sequence length of the multiple-subframe spreading code is $N_{SF}$, a field of ceil($\log_2 N_{SF}$) bits is required and, thus, the overhead increases. Note that the function "ceil(X)" represents a ceiling function that returns the smallest integer greater than or equal to X.

Therefore, according to an aspect of the present disclosure, a communication device and a communication method are provided. The communication device and the communication method are capable of sharing a multiple-subframe spreading code to be used between a base station and a terminal without increasing the overhead while ensuring the flexibility of uplink scheduling and increasing the overhead.

Embodiments of the present disclosure are described in detail below with reference to the accompanying drawings.

Overview of Communication System

The communication system according to each of the embodiments of the present disclosure is, for example, a system that supports LTE-Advanced. The communication system includes a base station 100 and a terminal 200 as communication devices.

It is assumed that a plurality of terminals 200 in an MTC coverage enhancement mode exist in the cell of the base station 100. For example, when the MTC coverage enhancement mode is applied, the terminal 200 transmits the PUSCH through repetition across a plurality of subframes (repetition transmission). In this case, for example, in the repetition transmission, the same signal is transmitted a plurality of times each in one of the subframes. That is, the terminal 200 repeatedly transmits the same signal a number of times equal to a predetermined repetition number in successive subframes equal in number to the predetermined repetition number (also referred to as a "repetition level" or "repetition factor"). At this time, the terminal 200 multiplies the signals to be transmitted in the subframes through repetition transmission by the components of the multiple-subframe spreading code sequence, respectively (multiple-subframe spreading).

Figure 1:
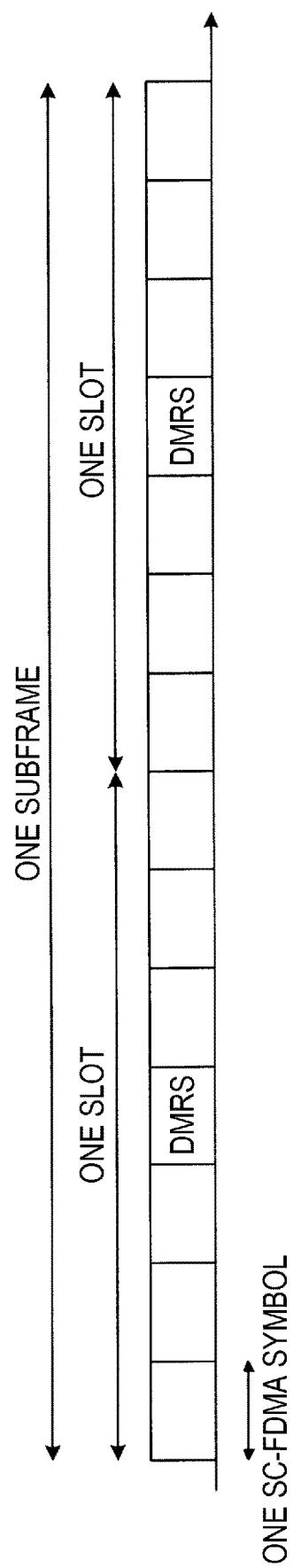
FIG. 1 illustrates an example of a PUSCH subframe configuration.
Figure 2:
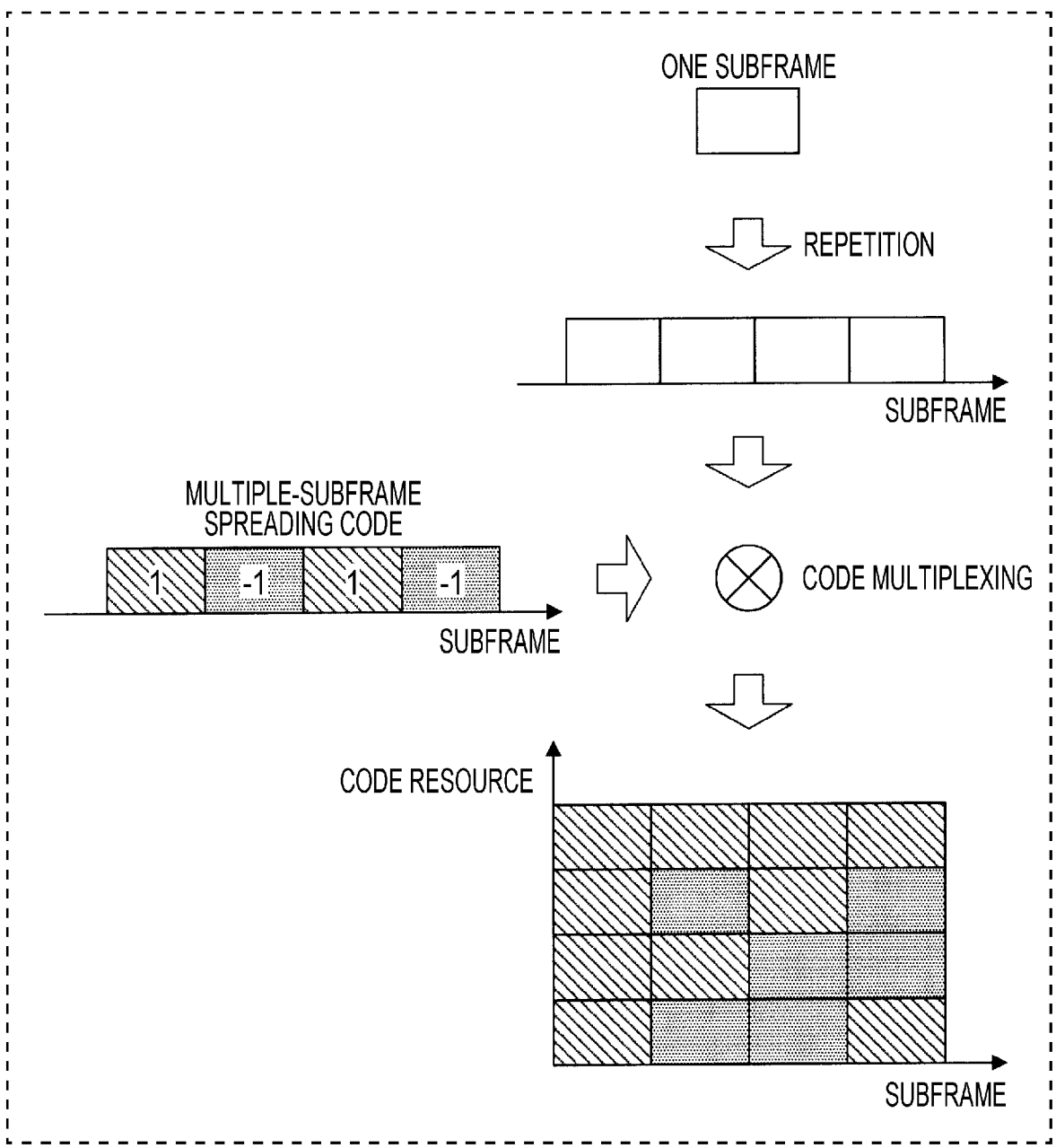
FIG. 2 illustrates an example of the multiple-subframe spreading operation.

For example, when $N_{Rep}$ repetitions are performed (that is, the repetition number: $N_{Rep}$), the terminal 200 repeatedly transmits the signal of one subframe across the $N_{Rep}$ subframes. At this time, the terminal 200 multiplies the signals transmitted through repetition transmission by the components of the multiple-subframe spreading code sequence, respectively. FIG. 2 illustrates an example of the multiple-subframe spreading for the PUSCH when the repetition number $N_{Rep}$ is 4 and the sequence length (or the spreading factor) $N_{SF}$ of the multiple-subframe spreading code sequence is 4. The sequence length or the spreading factor $N_{SF}$ of the multiple-subframe spreading code sequence may be the same as the repetition number $N_{Rep}$ or may be a predetermined value (for example, a cell-specific value).

As described above, the terminal 200 set in the MTC coverage enhancement mode performs repetition on PUSCH in which data symbols and DMRSs are time-multiplexed within one subframe across a plurality of subframes. Furthermore, the terminal 200 multiplies the signals each in one of a plurality of subframes by the components of one of a plurality of multiple-subframe spreading code sequences which are orthogonal to one another, respectively.

Figure 3:
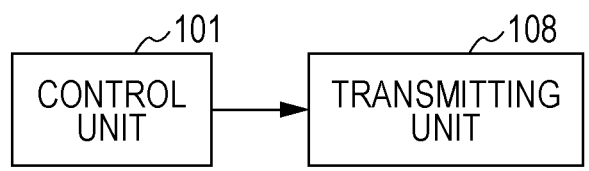
FIG. 3 illustrates the configuration of the main portion of a base station according to a first embodiment.

FIG. 3 is a block diagram illustrating the configuration of a main portion of the base station 100 according to the embodiment of the present disclosure. In the base station 100 illustrated in FIG. 3, a control unit 101 selects, from among a plurality of code sequences orthogonal to one another, one code sequence to be multiplied by an uplink signal (PUSCH) that includes a demodulation reference signal and that is subjected to repetition across a plurality of subframes. The transmitting unit 108 transmits, to a terminal (a terminal in the MTC coverage enhancement mode) for which transmission of the uplink signal subjected to repetition is configured, information indicating the selected one of the code sequences (downlink control information (DCI)) by using a field for indicating a cyclic shift and an orthogonal sequence (OCC) used for the demodulation reference signal.

Figure 4:
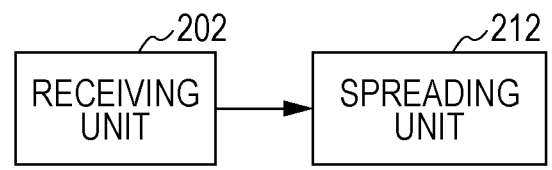
FIG. 4 illustrates the configuration of the main portion of a terminal according to the first embodiment.

In addition, FIG. 4 is a block diagram illustrating the configuration of a main portion of the terminal 200 according to each of the embodiments of the present disclosure. In the terminal 200 illustrated in FIG. 4, when transmission of an uplink signal (PUSCH) subjected to repetition is configured (set) in the case of an MTC coverage enhancement mode), a receiving unit 202 receives information indicating one of a plurality of code sequences orthogonal to one another (downlink control information (DCI)) by using the field used for indicating a cyclic shift and an orthogonal sequence (OCC) used for the demodulation reference signal. A spreading unit 212 multiplies the uplink signal including the demodulation reference signal and subjected to repetition across a plurality of subframes by the code sequence indicated by the received information.

First Embodiment

Configuration of Base Station

Figure 5:
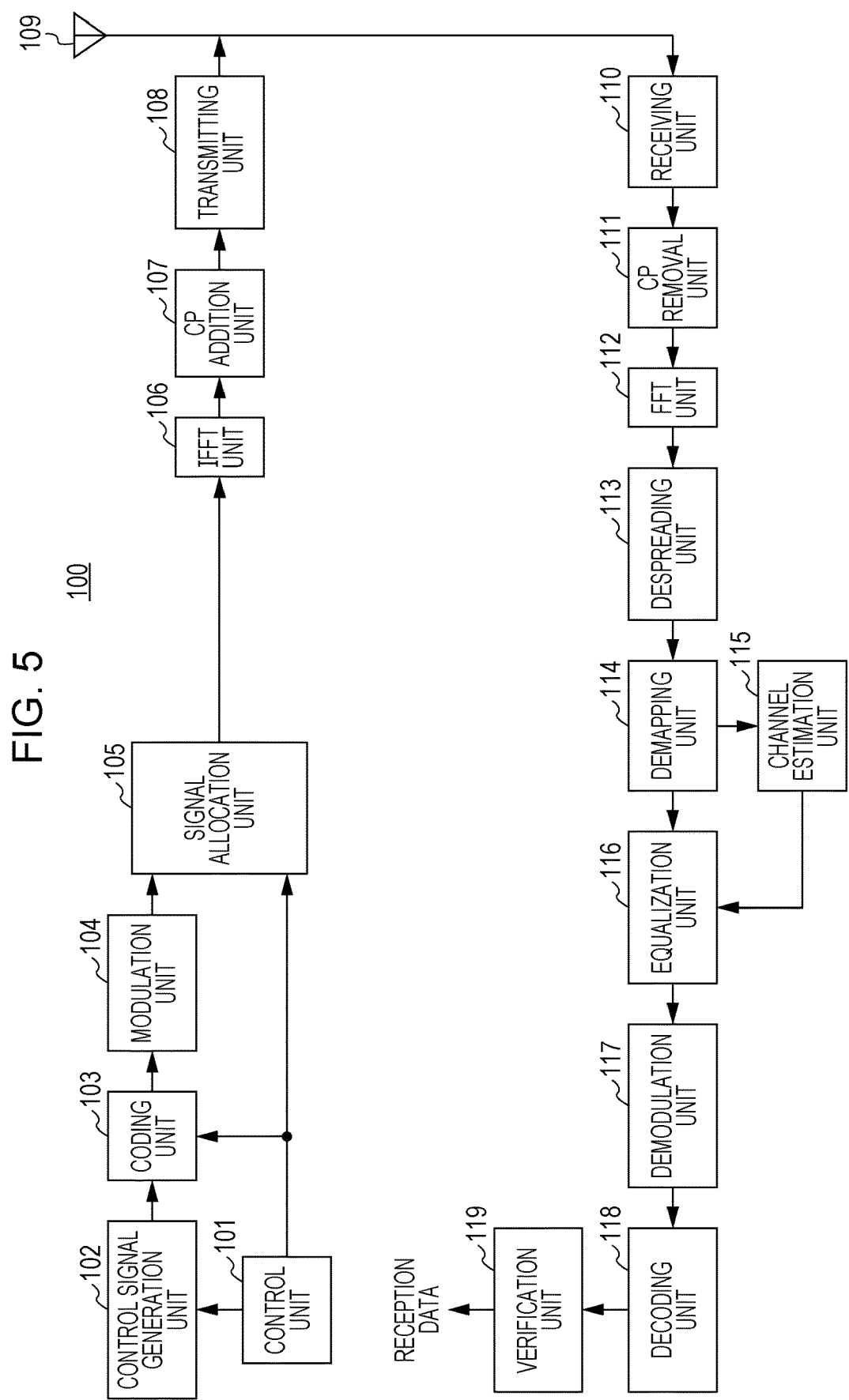
FIG. 5 illustrates the configuration of the base station according to the first embodiment.

FIG. 5 is a block diagram illustrating the configuration of the base station 100 according to a first embodiment of the present disclosure. In FIG. 5, the base station 100 includes a control unit 101, a control signal generation unit 102, a coding unit 103, a modulation unit 104, a signal allocation unit 105, an IFFT (Inverse Fast Fourier Transform) unit 106, a CP (Cyclic Prefix) addition unit 107, a transmitting unit 108, an antenna 109, a receiving unit 110, a CP removal unit 111, an FFT (Fast Fourier Transform) unit 112, a despreading unit 113, a demapping unit 114, a channel estimation unit 115, an equalization unit 116, a demodulation unit 117, a decoding unit 118, and a verification unit 119.

It should be noted that each of the configurations of the base station 100 illustrated in FIG. 5 is only an example and, thus, can be replaced with another configuration or removed. All of the configurations are not necessarily required to practice the present disclosure.

The control unit 101 determines allocation of PUSCH to the terminal 200. For example, the control unit 101 determines (selects) a frequency resource, a modulation/coding scheme, and a multiple-subframe spreading code to be allocated to the terminal 200. Thereafter, the control unit 101 outputs information about the determined allocation of PUSCH to the control signal generation unit 102.

In addition, the control unit 101 determines a coding level for the control signal and outputs the determined coding level to the coding unit 103. In addition, the control unit 101 determines a radio resource (a downlink resource) to which the control signal is mapped and outputs information about the determined radio resource to the signal allocation unit 105.

The control signal generation unit 102 generates a control signal destined for the terminal 200. The control signal includes an uplink DCI for indicating the information about PUSCH allocation received from the control unit 101. The uplink DCI is formed by a plurality of bits and includes information indicating, for example, a frequency allocation resource and a modulation/coding scheme.

In addition, the uplink DCI for the terminal 200 in the MTC coverage enhancement mode (the terminal 200 that performs PUSCH repetition transmission across a plurality of subframes) includes an MSCI (Multiple-subframe spreading code indicator) for indicating the multiple-subframe spreading code to the terminal 200. The MSCI consists of 3 bits or 2 bits. Furthermore, when the MSCI consists of 2 bits, the uplink DCI includes a 1-bit virtual CRC. Still furthermore, the uplink DCI for terminals that are not in the MTC coverage enhancement mode (terminals that do not perform PUSCH repetition transmission across a plurality of subframes) includes information indicating the cyclic shift and the OCC used for DMRS.

The control signal generation unit 102 generates a control information bit string (a control signal) using the information input from the control unit 101 and outputs the generated control signal to the coding unit 103. Note that the control signal generation unit 102 generates the bit string by including, in the control signal for each of the terminals 200, the terminal ID of the terminal 200. For example, the CRC bits masked by the terminal ID are added to the control signal.

The coding unit 103 encodes the control signal (the coded bit string) received from the control signal generation unit 102 in accordance with the coding level indicated by the control unit 101 and outputs the coded control signal to the modulation unit 104.

The modulation unit 104 modulates the control signal received from the coding unit 103 and outputs the modulated control signal (a symbol sequence) to the signal allocation unit 105.

The signal allocation unit 105 maps the control signal received from the modulation unit 104 to the radio resource indicated by the control unit 101. Note that the control channel to which the control signal is mapped may be a PDCCH for MTC or an EPDCCH (Enhanced PDCCH). The signal allocation unit 105 outputs, to the IFFT unit 106, a downlink subframe signal including the PDCCH for MTC or the EPDCCH to which the control signal is mapped.

The IFFT unit 106 performs IFFT processing on the signal received from the signal allocation unit 105 to convert the frequency domain signal into a time domain signal. The IFFT unit 106 outputs the time domain signal to the CP addition unit 107.

The CP addition unit 107 adds a CP to the signal received from the IFFT unit 106 and outputs, to the transmitting unit 108, the signal with the added CP (an OFDM signal).

The transmitting unit 108 performs RF (Radio Frequency) processing, such as D/A (Digital-to-Analog) conversion and up-conversion, on the OFDM signal received from the CP addition unit 107 and transmits a radio signal to the terminal 200 via the antenna 109.

The receiving unit 110 performs RF processing, such as down-conversion and A/D (Analog-to-Digital) conversion, on the uplink signal (PUSCH) received from the terminal 200 via the antenna 109 and outputs the obtained received signal to the CP removal unit 111. The uplink signal (PUSCH) transmitted from the terminal 200 includes the signals subjected to repetition across a plurality of subframes and, thus, subjected to multiple-subframe spreading.

The CP removal unit 111 removes the CP added to the reception signal received from the receiving unit 110 and outputs the signal after CP removal to the FFT unit 112.

The FFT unit 112 performs FFT processing on the signal received from the CP removal unit 111 to decompose the signal into a signal sequence in the frequency domain, extracts a signal corresponding to the subframe of the PUSCH, and outputs the extracted signal to the despreading unit 113.

The despreading unit 113 despreads the data signal and a signal corresponding to the DMRS on the PUSCH subjected to repetition transmission and multiple-subframe spreading across a plurality of subframes by using the multiple-subframe spreading code to be used by the terminal 200 for multiple-subframe spreading. For example, the multiple-subframe spreading code to be used by the terminal 200 for multiple-subframe spreading is indicated by the control unit 101. The despreading unit 113 outputs the despread signal to the demapping unit 114.

The demapping unit 114 extracts, from the signal received from the despreading unit 113, a subframe portion of the PUSCH allocated to the terminal 200. In addition, the demapping unit 114 decomposes the extracted subframe portion of the PUSCH of the terminal 200 into DMRS and a data symbol (a SC-FDMA data symbol). Thereafter, the demapping unit 114 outputs the DMRS to the channel estimation unit 115 and outputs the data symbol to the equalization unit 116.

The channel estimation unit 115 performs channel estimation using the DMRS input from the demapping unit 114. The channel estimation unit 115 outputs the obtained channel estimation value to the equalization unit 116.

The equalization unit 116 equalizes the data symbol input from the demapping unit 114 by using the channel estimation value input from the channel estimation unit 115. The equalization unit 116 outputs the equalized data symbol to the demodulation unit 117.

The demodulation unit 117 applies IDFT (Inverse Discrete Fourier Transform) processing to the SC-FDMA data symbol in the frequency domain input from the equalization unit 116 to convert the SC-FDMA data symbol into a time domain signal. Thereafter, the demodulation unit 117 performs data demodulation on the signal. More specifically, the demodulation unit 117 converts the symbol sequence into a bit string on the basis of the modulation scheme specified for the terminal 200 to use and outputs the obtained bit string to the decoding unit 118.

The decoding unit 118 performs error correction decoding on the bit string input from the demodulation unit 117 and outputs the decoded bit string to the verification unit 119.

The verification unit 119 performs error detection on the bit string input from the decoding unit 118. Error detection is performed using the CRC bits added to the bit string. If the result of the CRC bit verification indicates no error, the verification unit 119 extracts the received data and outputs ACK. However, if the verification result of the CRC bits indicates the occurrence of an error, the verification unit 119 outputs NACK. The ACK and NACK output from the verification unit 119 are used in a retransmission control process performed by a control unit (not illustrated).

Configuration of Terminal

Figure 6:
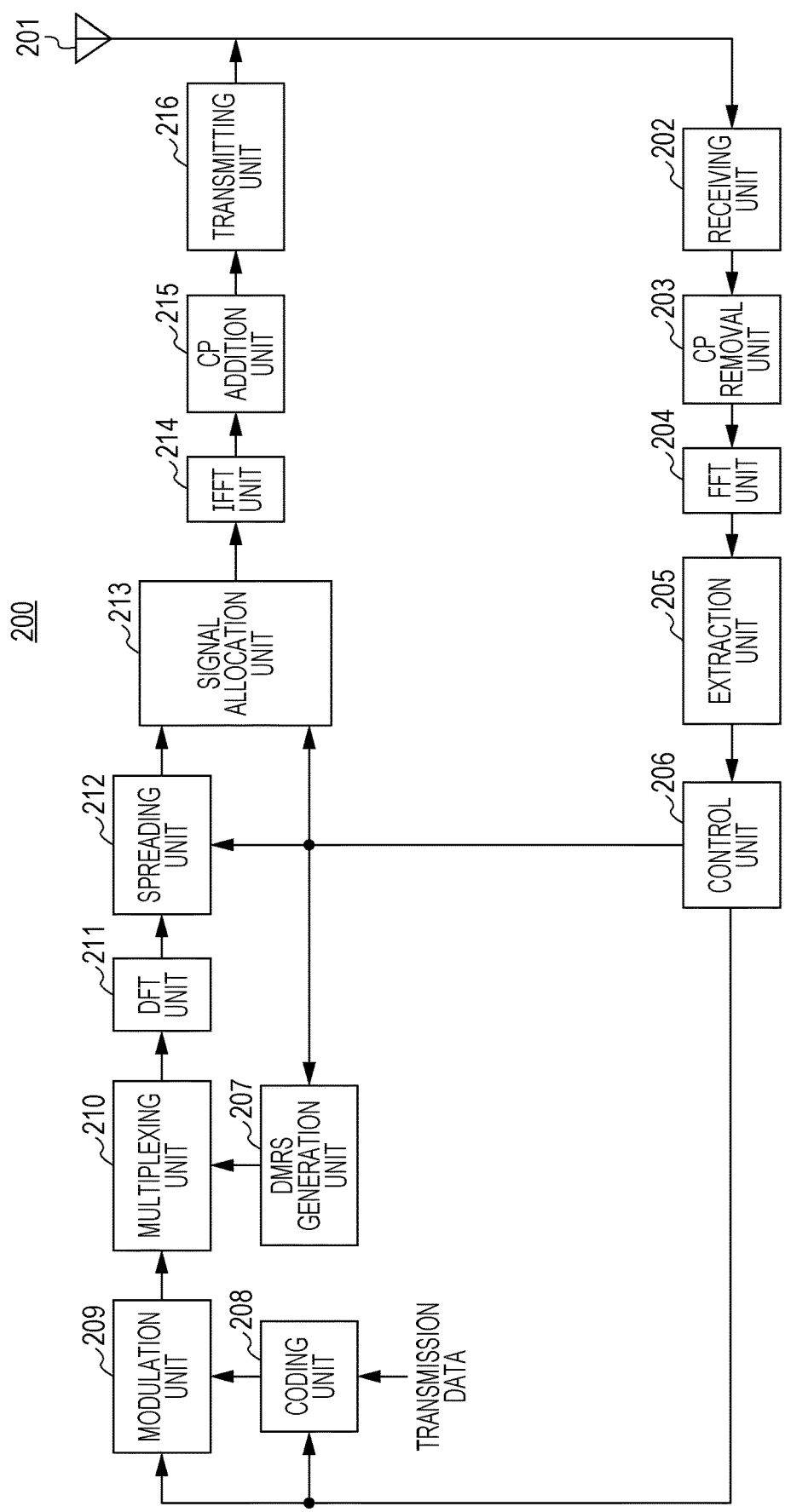
FIG. 6 illustrates the configuration of the terminal according to the first embodiment.

FIG. 6 is a block diagram illustrating the configuration of the terminal 200 according to the first embodiment of the present disclosure. In FIG. 6, the terminal 200 includes an antenna 201, a receiving unit 202, a CP removal unit 203, an FFT unit 204, an extraction unit 205, a control unit 206, a DMRS generation unit 207, a coding unit 208, a modulation unit 209, a multiplexing unit 210, a DFT unit 211, a spreading unit 212, a signal allocation unit 213, an IFFT unit 214, a CP addition unit 215, and a transmitting unit 216.

It should be noted that each of the configurations of the terminal 200 illustrated in FIG. 6 is only an example and, thus, can be replaced with another configuration or removed. All of the configurations are not necessarily required to practice the present disclosure.

The receiving unit 202 performs RF processing, such as down-conversion or AD conversion, on the radio signal (PDCCH or EPDCCH for MTC) from the base station 100 received via the antenna 201 and obtains a baseband OFDM signal. The receiving unit 202 outputs the OFDM signal to the CP removal unit 203.

The CP removal unit 203 removes the CP added to the OFDM signal received from the receiving unit 202 and outputs the signal after CP removal to the FFT unit 204.

The FFT unit 204 performs FFT processing on the signal received from the CP removal unit 203 and, thus, converts the time domain signal into a frequency domain signal. The FFT unit 204 outputs the frequency domain signal to the extraction unit 205.

The extraction unit 205 performs blind decoding on the frequency domain signal received from the FFT unit 204 and determines whether the signal is a control signal destined for the terminal itself. The control signal has CRC masked by the terminal ID and added thereto. Therefore, if the CRC verification is OK (no error) as a result of the blind decoding, the extraction unit 205 determines that the signal is control information destined for the terminal itself and outputs the control information to the control unit 206. In addition, if the control signal includes a virtual CRC, the extraction unit 205 determines whether the control signal is a control signal destined for the terminal itself by using the result of CRC verification and a bar channel CRC.

The control unit 206 controls PUSCH transmission on the basis of the control signal input from the extraction unit 205. More specifically, the control unit 206 instructs the signal allocation unit to use the resource allocated to PUSCH transmission on the basis of the PUSCH resource allocation information included in the control signal. In addition, the control unit 206 instructs the coding unit 208 and the modulation unit 209 to use a coding method and a modulation scheme used for PUSCH transmission, respectively, on the basis of the information about the coding/modulation method included in the control signal. Furthermore, in the case of the MTC coverage enhancement mode (in the case where repetition transmission is performed for PUSCH across a plurality of subframes), the control unit 206 determines the multiple-subframe spreading code used for PUSCH repetition transmission on the basis of the MSCI included in the control signal and instructs the spreading unit 212 to use the determined multiple-subframe spreading code. However, in the case of a mode other than the MTC coverage enhancement mode (in the case where repetition transmission is not performed for PUSCH across a plurality of subframes), the control unit 206 determines the cyclic shift and the OCC used for the DMRS on the basis of the information that specifies the cyclic shift and the OCC to be used for the DMRS and that is included in the uplink DCI and gives, to the DMRS generation unit 207, an instruction to use the determined cyclic shift and OCC.

The DMRS generation unit 207 generates a DMRS in accordance with a DMRS pattern indicated by the control unit 206 and outputs the generated DMRS to the multiplexing unit 210.

The coding unit 208 adds the CRC bits masked by the terminal ID of the terminal 200 to the input transmission data (the uplink data) and performs error correction coding. Thereafter, the coding unit 208 supplies the encoded bit string to the modulation unit 209.

The modulation unit 209 modulates the bit string received from the coding unit 208 and outputs the modulated signal (the data symbol sequence) to the multiplexing unit 210.

The multiplexing unit 210 time-multiplexes the data symbol sequence input from the modulation unit 209 and the DMRS input from the DMRS generation unit 207 within one subframe. Thereafter, the multiplexing unit 210 outputs the multiplexed signal to the DFT unit 211.

The DFT unit 211 applies DFT to the signal input from the multiplexing unit 210 and generates a frequency domain signal. Thereafter, the DFT unit 211 outputs the generated frequency domain signal to the spreading unit 212.

If the terminal including the spreading unit 212 is in the MTC coverage enhancement mode, the spreading unit 212 performs repetition on a signal input from the DFT unit 211 across a plurality of subframes and generates repetition signals. In addition, the spreading unit 212 performs multiple-subframe spreading on the repetition signals by using the multiple-subframe spreading code specified by the control unit 206. Thereafter, the spreading unit 212 outputs the spread signal to the signal allocation unit 213. That is, the spreading unit 212 multiplies the repetition signals each in one of the subframes to be subjected to repetition by the components of the multiple-subframe spreading code sequence, respectively.

The signal allocation unit 213 maps the signal received from the spreading unit 212 to the time/frequency resources of the PUSCH specified by the control unit 206. The signal allocation unit 213 outputs, to the IFFT unit 214, the signal on the PUSCH to which the signal is mapped.

The IFFT unit 214 generates a time domain signal by performing IFFT processing on the PUSCH signal in the frequency domain input from the signal allocation unit 213. The IFFT unit 214 outputs the generated signal to the CP addition unit 215.

The CP addition unit 215 adds a CP to the time domain signal received from IFFT unit 214 and outputs, to the transmitting unit 216, the signal after CP addition.

The transmitting unit 216 performs RF processing, such as D/A conversion and up-conversion, on the signal received from the CP addition unit 215 and transmits a radio signal to the base station 100 via the antenna 201.

Operation Performed by Base Station and Terminal

A method for sharing the multiple-subframe spreading code between the base station 100 and terminal 200 having the above-described configurations is described in detail below.

As described above, in the LTE-A, when SU-MIMO and MU-MIMO are applied, in order to reduce interference between the DMRSs transmitted using the same time/frequency resource, the plurality of DMRSs are orthogonally multiplexed in a subframe by applying different cyclic shifts to the DMRSs between the terminals or by multiplying two DMRSs in the PUSCH by different OCCs among the terminals.

In addition, information about cyclic shift used for DMRS and information about OCC are indicated by using the uplink DCI. More specifically, among a plurality of DCI formats, DCI format 0 or DCI format 4 uses 3 bits as a field for indicating the cyclic shift used for the DMRS and the OCC.

Note that it is likely that MTC coverage enhancement is employed in an environment where the reception power of a desired signal from a terminal in a base station is very small. In addition, in such an environment, it is likely that an increase in communication capacity by using MIMO is not needed and, thus, SU-MIMO and MU-MIMO are not used.

Furthermore, in MTC coverage enhancement, it is assumed that transmission and reception using a narrow band of about 1.4 MHz in the system band is used in order to reduce the cost of terminals (refer to, for example, RP-141660, Ericsson, Nokia Networks, "New WI proposal: Further LTE Physical Layer Enhancements for MTC"). In LTE-A, it is studied to increase the coverage enhancement effect by applying frequency hopping of the narrow band of 1.4 MHz within the system band (refer to, for example, RP-141660, Ericsson, Nokia Networks, "New WI proposal: Further LTE Physical Layer Enhancements for MTC"). If frequency hopping is applied, interference between neighboring cells can be randomized by using different hopping patterns between the neighboring cells. Accordingly, it is likely that the operation for MTC coverage enhancement is performed in an environment where there is almost no interference between neighboring cells (an isolated cell environment).

As described above, in MTC coverage enhancement, it is likely that MIMO is not used and the operation is performed in an isolated cell environment. Therefore, in MTC coverage enhancement, it is highly likely that a plurality of signals using the same time/frequency resource do not exist at the same time, and a plurality of terminals causing mutual interference are not present at the same time. Note that when a multiple-subframe spreading code is used, a plurality of terminals using the same time/frequency resources at the same time are present, but it can be said that the terminals are orthogonalized by code resources since different multiple-subframe spreading codes are used.

Accordingly, in MTC coverage enhancement, the need for orthogonalization of DMRSs that is necessary in existing LTE-A is low. That is, in MTC coverage enhancement, to reduce interference between DMRSs, the need to control the cyclic shift and OCC used for DMRS among DMRSs is low. For example, any one pair of cyclic shift and OCC may be used. Thus, if, for example, the cyclic shift and the OCC used by the terminal are determined in advance (are not dynamically changed), the cyclic shift and the OCC need not be indicated from the base station to the terminal (need not be dynamically changed) by using the DCI.

Therefore, according to the present embodiment, to indicate the multiple-subframe spreading code to the terminal 200 in the MTC coverage enhancement mode, the base station 100 uses the existing DCI field, which is used to indicate the cyclic shift and the OCC used for the DMRS. That is, when repetition is applied to the PUSCH, the base station 100 (the transmitting unit 108) uses the field for indicating the cyclic shift and the OCC used for DMRS transmitted on the PUSCH to transmit information (MSCI) indicating one multiple-subframe spreading code sequence selected from among a plurality of multiple-subframe spreading code sequences.

As an example, description is given with reference to the following case. That is, the terminal 200 is set in the MTC coverage enhancement mode, and multiple-subframe spreading using a multiple-subframe spreading code having a sequence length (the code spreading factor) $N_{SF}=8$ is applied when PUSCH repetition transmission is performed.

The base station 100 indicates, to the terminal 200, the cyclic shift and the OCC used by the terminal 200 for the DMRS in advance. The cyclic shift and the OCC used for DMRS may be predefined between the base station 100 and the terminal 200. In addition, the base station 100 may indicate, to the terminal 200, the cyclic shift and the OCC used for the DMRS via the higher layer.

The DMRS may be generated on the basis of the CAZAC (Constant Amplitude Zero Auto-Correlation) sequence, which is used in LTE Rel. 8 to 12 and has excellent autocorrelation characteristics and mutual correlation characteristics, or a sequence other than the CAZAC sequence.

In addition, the base station 100 shares a plurality of multiple-subframe spreading codes that can be specified for the terminal 200 with the terminal 200 in advance. The multiple-subframe spreading code that can be specified may be determined in advance between the base station 100 and the terminal 200, or the base station 100 may indicate, to the terminal 200, the multiple-subframe spreading code via the higher layer.

For example, when a Walsh sequence having a sequence length (code spreading factor) $N_{SF}=8$ is used as the multiple-subframe spreading code, the following eight multiple-subframe spreading codes can be specified:

0: (1, 1, 1, 1, 1, 1, 1, 1),
1: (1, −1, 1, −1, 1, −1, 1, −1),
2: (1, 1, −1, −1, 1, 1, −1, −1),
3: (1, −1, −1, 1, 1, −1, −1, 1),
4: (1, 1, 1, 1, −1, −1, −1, −1),
5: (1, −1, 1, −1, −1, 1, −1, 1),
6: (1, 1, −1, −1, −1, −1, 1, 1), and
7: (1, −1, −1, 1, −1, 1, 1, −1).

The base station 100 transmits the uplink DCI to the terminal 200 via the PDCCH for MTC or E P DCC H to specify the allocation resources of the PUSCH.

At this time, the uplink DCI includes information (MSCI) specifying a multiple-subframe spreading code. The MSCI is information that instructs the terminal 200 to use a specific multiple-subframe spreading code among a plurality of candidates of the multiple-subframe spreading code.

That is, the base station 100 (the control unit 101 and the control signal generation unit 102) selects, from among the plurality of candidates of the multiple-subframe spreading code, a multiple-subframe spreading code specified for the terminal 200 and generates an MSCI indicating the multiple-subframe spreading code. Thereafter, the base station 100 transmits, to the terminal 200, the uplink DCI including the generated MSCI.

At this time, the base station 100 transmits the MSCI by using the existing field for indicating the cyclic shift and the information about the OCC used for the DMRS. That is, the base station 100 uses the existing field for indicating the cyclic shift and the OCC used for DMRS to the terminal 200 set in the MTC coverage enhancement mode as a field for indicating the multiple-subframe spreading code.

FIG. 7A illustrates an example of a field for indicating the cyclic shift and OCC used for DMRS. In FIG. 7A, the existing field for indicating the cyclic shift ($n^{(2)}_{DMRS, \lambda}$) and the information about OCC ([$w^{(\lambda)}(0)$ $w^{(\lambda)}(1)$]) used for DMRS consists of 3 bits (000 to 111).

In contrast, FIG. 7B illustrates an example of the field for indicating the multiple-subframe spreading code. As illustrated in FIG. 7B, for the MSCI for indicating the multiple-subframe spreading code, the existing field having 3 bits (000 to 111) illustrated in FIG. 7A is used. Each of the values (000 to 111) represented by the 3 bits that constitute the field is associated with one of the multiple-subframe spreading code sequences #0 to #7.

That is, FIG. 7B illustrates an example in which the existing 3-bit field for indicating the cyclic shift and the OCC used for the DMRS illustrated in FIG. 7A is associated with an MSCI for indicating a multiple-subframe spreading code.

The terminal 200 (the extraction unit 205) performs blind decoding on the received PDCCH for MTC or EPDCCH to obtain a DCI destined for the terminal 200 itself. Thereafter, if repetition across a plurality of subframes is applied to the PUSCH, the terminal 200 extracts the MSCI indicating the multiple-subframe spreading code sequence from the field of the received DCI for indicating the cyclic shift and the OCC used for the DMRS transmitted on the PUSCH. By using the MSCI, the terminal 200 (the control unit 206) selects one of the multiple-subframe spreading codes to be used by the terminal 200 from among a plurality of the candidates of the multiple-subframe spreading code. Thereafter, the terminal 200 (the spreading unit 212) performs PUSCH repetition transmission in accordance with the determined multiple-subframe spreading code.

Then, the base station 100 receives the PUSCH across the plurality of subframes transmitted from the terminal 200 and performs multiple-subframe despreading using the multiple-subframe spreading code used by the terminal 200. In addition, the base station 100 performs channel estimation on the basis of the DMRS extracted from the PUSCH subframes after multiple-subframe despreading and performs equalization, repetition combining, demodulation, and decoding on the data symbol by using the obtained channel estimation value.

As described above, according to the present embodiment, the base station 100 transmits, to the terminal 200 set in the MTC coverage enhancement mode, the multiple-subframe spreading code (MSCI) by using the existing field (3 bits in FIG. 7A) for indicating the cyclic shift and OCC used for DMRS.

In this manner, according to the present embodiment, the multiple-subframe spreading code can be shared between the base station 100 and the terminal 200 without increasing the overhead.

Second Embodiment

When multiple-subframe spreading is used, the orthogonality needs to be maintained among the multiple-subframe spreading code sequences for a period of time that is the spreading factor (the sequence length) of the multiple-subframe code spreading times the subframe period. For this reason, as compared with code spreading within a subframe, intersymbol interference tends to occur due to distortion of the orthogonality among the multiple-subframe spreading code sequences.

For DMRS, to improve the channel estimation accuracy, it is desirable to minimize the intersymbol interference.

Therefore, according to the present embodiment, a device and a method capable of suppressing the intersymbol interference among DMRSs by using orthogonalization using the cyclic shift and OCC used for DMRS of existing LTE-A in addition to orthogonalization using a multiple-subframe spreading code are described.

Note that since a base station and a terminal according to the present embodiment have basic configurations that are the same as those of the base station 100 and the terminal 200 according to the first embodiment, the configurations are described with reference to FIGS. 5 and 6.

As an example, the description below is given with reference to the following case. That is, the terminal 200 is set in the MTC coverage enhancement mode, and multiple-subframe spreading using a multiple-subframe spreading code having a sequence length (the code spreading factor) $N_{SF}=8$ is applied when PUSCH repetition transmission is performed.

The base station 100 shares a plurality of combinations of cyclic shift and OCC used for DMRS, which can be provided to the terminal 200, with the terminal 200 in advance. The combination of cyclic shift and OCC that can be provided may be predefined between the base station 100 and the terminal 200, or the base station 100 may provide the combinations to the terminal 200 via the higher layer.

The DMRS is generated on the basis of the CAZAC (Constant Amplitude Zero Auto-Correlation) sequence, which is used in LTE Rel. 8 to 12 and has excellent autocorrelation characteristics and mutual correlation characteristics.

In addition, the base station 100 shares a plurality of multiple-subframe spreading codes, which can be provided to the terminal 200, with the terminal 200 in advance. The multiple-subframe spreading code that can be provided may be determined in advance between the base station 100 and the terminal 200, or the base station 100 may provide the multiple-subframe spreading code to the terminal 200 via the higher layer.

For example, when a Walsh sequence having a sequence length (a code spreading factor) $N_{SF}=8$ is used as the multiple-subframe spreading code, the following eight multiple-subframe spreading codes can be specified:

0: (1, 1, 1, 1, 1, 1, 1, 1),
1: (1, −1, 1, −1, 1, −1, 1, −1),
2: (1, 1, −1, −1, 1, 1, −1, −1),
3: (1, −1, −1, 1, 1, −1, −1, 1),
4: (1, 1, 1, 1, −1, −1, −1, −1),
5: (1, −1, 1, −1, −1, 1, −1, 1),
6: (1, 1, −1, −1, −1, −1, 1, 1), and
7: (1, −1, −1, 1, −1, 1, 1, −1).

The base station 100 transmits the uplink DCI to the terminal 200 via the PDCCH for MTC or EPDCCH to specify the allocation resources of the PUSCH.

At this time, like the first embodiment, the uplink DCI includes information (MSCI) indicating a multiple-subframe spreading code.

However, according to the present embodiment, in addition to the multiple-subframe spreading code, the MSCI specifies, for the terminal 200, one of the combinations of cyclic shift and OCC selected from among a plurality of combinations of cyclic shift and OCC used for DMRS.

That is, the base station 100 (the control unit 101 and the control signal generation unit 102) determines the multiple-subframe spreading code specified for the terminal 200 and the combination of the cyclic shift and the OCC used for the DMRS and generates an MSCI on the basis of the multiple-subframe spreading code and combination of cyclic shift and OCC used for the DMRS. Thereafter, the base station 100 transmits, to the terminal 200, the uplink DCI including the generated MSCI.

That is, the base station 100 uses the existing field for indicating the information about the cyclic shift and information about the OCC used for DMRS to the terminal 200 set in the MTC coverage enhancement mode as a field for indicating the multiple-subframe spreading code and the cyclic shift and OCC used for DMRS.

FIG. 8 illustrates an example of a field for indicating the multiple-subframe spreading code and cyclic shift and OCC used for DMRS. As illustrated in FIG. 8, the existing field consisting of 3 bits (000 to 111) illustrated in FIG. 7A is used for MSCI that indicates the multiple-subframe spreading code and the cyclic shift and OCC used for DMRS. Each of the values (000 to 111) represented by the 3 bits that constitute the field is associated with one of the multiple-subframe spreading code sequences #0 to #7 and one of the combinations of a cyclic shift and an OCC.

That is, FIG. 8 illustrates an example in which the existing 3-bit field for indicating the cyclic shift and the OCC used for the DMRS illustrated in FIG. 7A is associated with an MSCI for indicating a multiple-subframe spreading code and a cyclic shift and an OCC used for the DMRS.

Note that in FIG. 8, as an example, each of the values of MSCI is associated with a combination of a cyclic shift and OCC at $\lambda=0$ illustrated in FIG. 7A. However, the correspondence between an MSCI and a combination of a cyclic shift and an OCC is not limited to that in FIG. 8. For example, the values of MSCI may be associated with the combinations of a cyclic shift and an OCC at any one of $\lambda=1$ to 3 illustrated in FIG. 7A. Alternatively, the values of MSCI may be associated with combinations other than the above-described combinations.

The terminal 200 (the extraction unit 205) performs blind decoding on the received PDCCH for MTC or EPDCCH to obtain a DCI destined for the terminal 200 itself. Thereafter, the terminal 200 in the MTC coverage enhancement mode extracts the MSCI, which indicates the multiple-subframe spreading code sequence, the cyclic shift, and the OCC, from the field of the received DCI for indicating the cyclic shift and the OCC used for the DMRS. By using the MSCI, the terminal 200 (the control unit 206) selects one of the multiple-subframe spreading codes used by the terminal 200 from among a plurality of the candidates of the multiple-subframe spreading code. In addition, by using the MSCI, the terminal 200 (the control unit 206) determines one combination of a cyclic shift and an OCC used by the terminal 200 from the plurality of combinations of a cyclic shift and an OCC.

Thereafter, the terminal 200 (the DMRS generation unit 207) generates a DMRS in accordance with the determined combination of a cyclic shift and an OCC. In addition, the terminal 200 (the spreading unit 212) performs PUSCH repetition transmission in accordance with the determined multiple-subframe spreading code.

In contrast, the base station 100 receives the PUSCH across a plurality of subframes transmitted from the terminal 200 and performs multiple-subframe despreading using the multiple-subframe spreading code used by the terminal 200. In addition, the base station 100 performs channel estimation on the basis of the DMRS extracted from the PUSCH subframe after multiple-subframe despreading and performs equalization, repetition combining, demodulation, and decoding on the data symbol by using the obtained channel estimation value.

As described above, like the first embodiment, according to the present embodiment, the base station 100 indicates, to the terminal 200 set in the MTC coverage enhancement mode, the multiple-subframe spreading code by using the existing field (3 bits in FIG. 7A) for indicating the cyclic shift and OCC used for DMRS. In this manner, according to the present embodiment, like the first embodiment, the multiple-subframe spreading code can be shared between the base station 100 and the terminal 200 without increasing the overhead.

In addition, according to the present embodiment, the base station 100 indicates, to the terminal 200 set in the MTC coverage enhancement mode, the cyclic shift and the OCC used for DMRS in addition to the multiple-subframe spreading code by using the MSCI. In this manner, according to the present embodiment, the base station 100 can indicate, to the terminal 200, the cyclic shift and the OCC used for the DMRS by using the DCI. As a result, even when multiple-subframe spreading is applied, intersymbol interference caused by distortion of the orthogonality among the multiple-subframe spreading code sequences can be prevented by orthogonalization of the DMRS and, thus, the occurrence of intersymbol interference among the DMRSs can be prevented.

Variation of Second Embodiment

Sufficient suppression of intersymbol interference occurring between DMRSs by taking into account the orthogonality between multiple-subframe spreading codes and the orthogonality between the DMRSs within a subframe by cyclic shift and OCC is discussed below.

Figure 9:
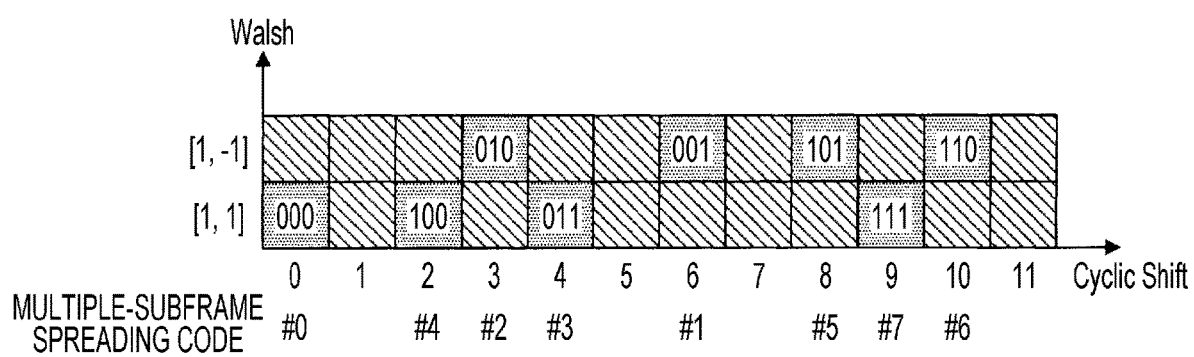
FIG. 9 illustrates a combination of a multiple-subframe spreading code, a cyclic shift, and an OCC indicated by using the MSCI according to the second embodiment.

FIG. 9 illustrates a multiple-subframe spreading code and a combination of a cyclic shift and an OCC associated with each of the values (000 to 111) of the MSCI illustrated in FIG. 8 on the cyclic shift axis and the orthogonal code axis. The value in a block illustrated in FIG. 9 represents the value of the MSCI.

For example, intersymbol interference due to the movement of the terminal 200 easily occurs between the multiple-subframe spreading code #0 (1, 1, 1, 1, 1, 1, 1, 1) corresponding to MSCI=000 and the multiple-subframe spreading code #4 (1, 1, 1, 1, −1, −1, −1, −1) corresponding to MSCI=100 and, thus, the orthogonality is low. Generally speaking, the orthogonality between the code corresponding to the nth column and the code corresponding to the (n+4)th column of the Walsh-Hadamard matrix (n=0 to 3) given by the following expression is low:

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (1)$$

In addition, for example, between the DMRS that corresponds to MSCI=000 and that uses the cyclic shift=0 and the OCC=[1 1] and the DMRS that corresponds to MSCI=100 and that uses the cyclic shift=2 and the OCC=[1 1], the cyclic shift difference is 2. Thus, the orthogonality between the cyclic shift sequences is low, and the same OCC is used. Therefore, these DMRSs are susceptible to the influence of difference in the transmission timing at the terminal 200 or a delay spread caused by multipath.

As described above, mapping of the multiple-subframe spreading code, cyclic shift and OCC to an MSCI may have an impact on intersymbol interference.

Therefore, according to the present variation, a method for reducing intersymbol interference by associating a pair of multiple-subframe spreading codes having low mutual orthogonality with cyclic shifts (cyclic shift sequences) and OCCs having high mutual orthogonality is described.

More specifically, two cyclic shifts having a difference of the maximum value 6 are associated with two multiple-subframe spreading codes corresponding to the nth column and the (n+4)th column (n=0 to 3) of the Walsh-Hadamard matrix, respectively. The multiple-subframe spreading code, the cyclic shift, and the OCC which are associated in this manner are associated with the MSCI.

Figures 10A, 10B:
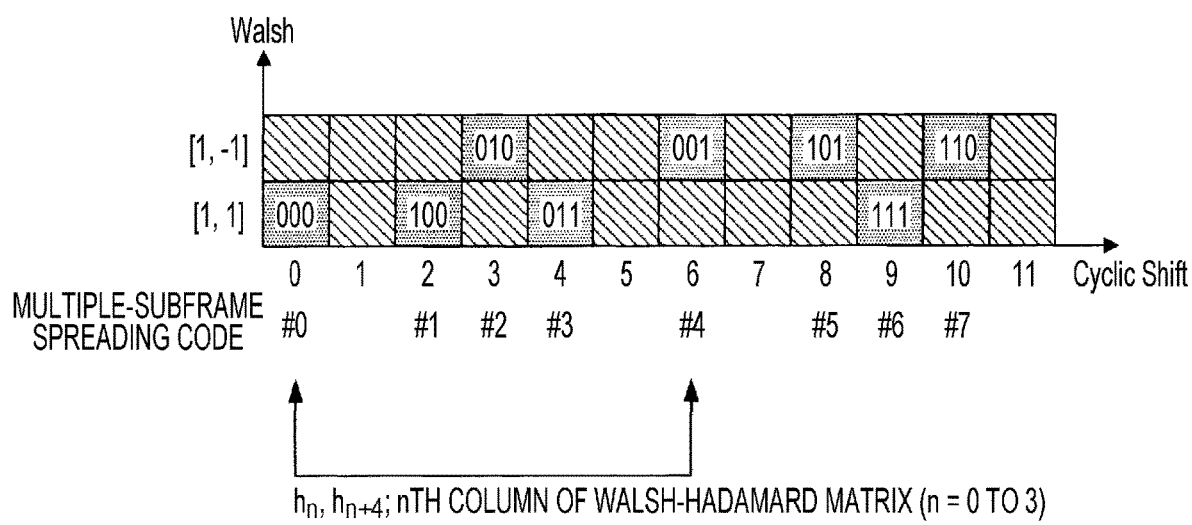
FIG. 10A illustrates an example of an MSCI for indicating a multiple-subframe spreading code and a cyclic shift and an OCC used for DMRS according to a variation of the second embodiment.
FIG. 10B illustrates a combination of a multiple-subframe spreading code, a cyclic shift, and an OCC indicated by using the MSCI according to the variation of the second embodiment.

FIG. 10A illustrates an example of a field for indicating the multiple-subframe spreading code and the cyclic shift and OCC used for DMRS. In FIG. 10A, the correspondence between the value represented by 3 bits constituting the MSCI (000 to 111) and each of the cyclic shift and OCC is the same as in FIG. 8.

For example, as illustrated in FIG. 10A, of the values (000 to 111) represented by 3 bits constituting the MSCI, the pair consisting of the multiple-subframe spreading code sequences #0 and #4 (the 0th and 4th columns of the Walsh-Hadamard matrix) having a low mutual orthogonality among the plurality of multiple-subframe spreading code sequences is associated with MSCI=000 and MSCI=001 having a cyclic shift=0 and a cyclic shift=6 associated therewith, respectively, whose difference is a maximum value of 6.

Similarly, as illustrated in FIG. 10A, the pair consisting of the multiple-subframe spreading code sequences #2 and #6

(the 2nd and 6th columns of the Walsh-Hadamard matrix) having a low mutual orthogonality among the plurality of multiple-subframe spreading code sequences is associated with MSCI=010 and MSCI=111 having the cyclic shift=3 and cyclic shift=9 associated therewith, respectively, whose difference is a maximum value of 6. The same applies to each of the other values of the MSCI illustrated in FIG. 10A.

FIG. 10B illustrates a combination of a multiple-subframe spreading code and a pair of a cyclic shift and an OCC (a combination associated with each of the values (000 to 111) of the MSCI illustrated in FIG. 10A) on the cyclic shift axis and the orthogonal code axis.

As illustrated in FIG. 10B, between the multiple-subframe spreading code #0 (1, 1, 1, 1, 1, 1, 1, 1) corresponding to MSCI=000 and the multiple-subframe spreading code #4 (1, 1, 1, 1, −1, −1, −1, −1) corresponding to MSCI=001, intersymbol interference caused by the movement of the terminal 200 easily occurs. However, as illustrated in FIG. 10B, the difference between the cyclic shifts respectively associated with the multiple-subframe spreading code #0 and the multiple-subframe spreading code #4 is a maximum value of 6. That is, although intersymbol interference caused by the movement of the terminal 200 easily occurs between the multiple-subframe spreading code sequences, the coding interference can be reduced by orthogonalization between the DMRSs associated with these subframe spreading code sequences.

By associating a pair of multiple-subframe spreading codes having low mutual orthogonality with a cyclic shift and an OCC having high mutual orthogonality in this manner, the intersymbol interference can be reduced.

Note that according to the present embodiment, the combination of a cyclic shift and an OCC used for DMRS is the same as the combination of a cyclic shift and an OCC in the existing LTE-A at λ=0 illustrated in FIG. 7A. In this way, the need for indicating the combination for MTC coverage enhancement is eliminated since a plurality of combinations of a cyclic shift and an OCC have already been indicated before transmission/reception of PUSCH.

Third Embodiment

According to the present embodiment, description is given with reference to the case in which the number of candidates of the multiple-subframe spreading code (the number of usable multiple-subframe spreading codes) to be indicated to a terminal set in the MTC coverage enhancement mode is smaller than the number of values indicated by using a number of bits constituting the existing field for indicating the cyclic shift and the OCC used for DMRS (the number of values represented by the bits).

Since the base station and the terminal according to the present embodiment have basic configurations that are the same as those of the base station 100 and the terminal 200 according to the first embodiment. Accordingly, description is given with reference to FIGS. 5 and 6.

According to the present embodiment, as an example, the following case is described. That is, the terminal 200 is set in the MTC coverage enhancement mode, and multiple-subframe spreading using a multiple-subframe spreading code having a sequence length (the code spreading factor) $N_{SF}=4$ is applied when PUSCH repetition transmission is performed. In addition, the existing field used to indicate a cyclic shift and the OCC used for DMRS consists of 3 bits.

Furthermore, according to the present embodiment, like the second embodiment, a combination of cyclic shift and OCC used for DMRS at λ=0 of the existing LTE-A illustrated in FIG. 7A is associated with an MSCI. By making the combination of cyclic shift and OCC used for DMRS the same as the combination in existing LTE-A, the need for indicating the combination for MTC coverage enhancement is eliminated since a plurality of combinations of a cyclic shift and an OCC have already been indicated before transmission/reception of PUSCH.

Like the second embodiment, the base station 100 shares a plurality of combinations of cyclic shift and OCC used for DMRS with the terminal 200, which can be specified for the terminal 200 in advance. In addition, like the second embodiment, the base station 100 shares a plurality of multiple-subframe spreading codes that can be specified for the terminal 200 with the terminal 200 in advance.

For example, when a Walsh sequence having a sequence length (a spreading factor) $N_{SF}=4$ is used as the multiple-subframe spreading code, the following four multiple-subframe spreading codes can be specified:

0: (1, 1, 1, 1)
1: (1, −1, 1, −1),
2: (1, 1, −1, −1), and
3: (1, −1, −1, 1).

In addition, the multiple-subframe spreading code that can be specified is expressed by using Walsh-Hadamard as follows:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (2)$$

Figures 11A, 11B:
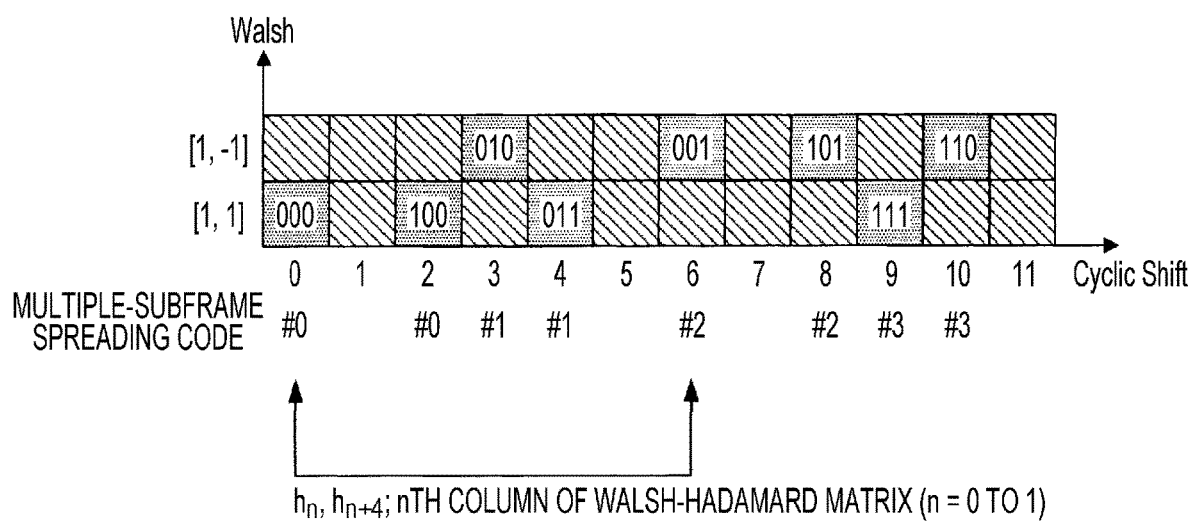
FIG. 11A illustrates an example of an MSCI for indicating a multiple-subframe spreading code and a cyclic shift and an OCC used for DMRS according to a third embodiment.
FIG. 11B illustrates a combination of a multiple-subframe spreading code, a cyclic shift, and an OCC indicated by using the MSCI according to the third embodiment.

FIG. 11A illustrates an example of a field for indicating the multiple-subframe spreading code and cyclic shift and OCC used for DMRS. As illustrated in FIG. 11A, when the spreading factor $N_{SF}$ of the multiple-subframe spreading code=4, the correspondence between an MSCI (3 bits) and a multiple-subframe spreading code (the number of candidates: 4) is not a one-to-one correspondence. That is, one multiple-subframe spreading code is associated with two MSCIs.

Here, it is assumed that signals from a plurality of terminals 200 are not multiplexed by using the same time/frequency resources and the same multiple-subframe spreading code at the same time. That is, among the plurality of terminals 200, it is assumed that the above-described two MSC's associated with one multiple-subframe spreading code are not used at the same time.

Therefore, according to the present embodiment, one multiple-subframe spreading code is associated with two cyclic shifts having low mutual orthogonality. In this manner, intersymbol interference can be reduced.

For example, as illustrated in FIG. 11A, the multiple-subframe spreading code #0 is associated with cyclic shift=0 and cyclic shift=2 having a cyclic shift difference of 2. The multiple-subframe spreading code #1 is associated with cyclic shift=3 and cyclic shift=4 having a cyclic shift difference of 1. The multiple-subframe spreading code #2 is associated with cyclic shift=6 and cyclic shift=8 having a cyclic shift difference of 2. The multiple-subframe spreading code #3 is associated with cyclic shift=9 and cyclic shift=10 having a cyclic shift difference of 1.

In addition, like the second embodiment, a pair of multiple-subframe spreading codes having low mutual orthogonality is associated with a DMRS using cyclic shift and OCC with high mutual orthogonality. In this manner, intersymbol interference can be reduced. More specifically, as illustrated in FIG. 11A, two multiple-subframe spreading codes corresponding to the nth column and the (n+2)th column (n=0 to 1) of the Walsh-Hadamard matrix are associated with two cyclic shifts having a maximum difference of 6, respectively. The multiple-subframe spreading code, the cyclic shift, and the OCC which are associated in this manner are associated with an MSCI.

For example, as illustrated in FIG. 11A, of the values (000 to 111) represented by 3 bits constituting the MSCI, MSCI=000 and MSCI=001 having a cyclic shift=0 and a cyclic shift=6 associated therewith, respectively, whose difference is a maximum value of 6 are associated with a pair consisting of the multiple-subframe spreading code sequences #0 and #2 (the 0th and 2nd columns of the Walsh-Hadamard matrix) having low mutual orthogonality among the plurality of multiple-subframe spreading code sequences. Similarly, MSCI=100 and MSCI=101 having a cyclic shift=2 and a cyclic shift=8 associated therewith, respectively, whose difference is a maximum value of 6 are associated with the pair consisting of the multiple-subframe spreading code sequences #0 and #2.

Still similarly, as illustrated in FIG. 11A, MSCI=010 and MSCI=111 having a cyclic shift=3 and a cyclic shift=9 associated therewith, respectively, whose difference is a maximum value of 6 are associated with a pair consisting of the multiple-subframe spreading code sequences #1 and #3 (the 1st and 3rd columns of the Walsh-Hadamard matrix) having low mutual orthogonality among the plurality of multiple-subframe spreading code sequences. Still similarly, MSCI=011 and MSCI=110 having a cyclic shift=4 and a cyclic shift=10 associated therewith, respectively, whose difference is a maximum value of 6 are also associated with the pair consisting of the multiple-subframe spreading code sequences #1 and #3.

FIG. 11B illustrates a multiple-subframe spreading code and a combination of the cyclic shift and OCC which are associated with each of the values (000 to 111) of the MSCI illustrated in FIG. 11A, on the cyclic shift axis and the orthogonal code axis.

As illustrated in FIG. 11B, the same multiple-subframe spreading code sequence is associated with two neighboring cyclic shifts among the cyclic shifts associated with the MSCI (usable cyclic shifts).

For example, the two cyclic shifts respectively associated with the multiple-subframe spreading code #0 corresponding to MSCI=000 and the multiple-subframe spreading code #0 corresponding to MSCI=100 have a difference of 2, and the same OCC is combined with the two shift codes. Accordingly, the orthogonality is low. However, the same multiple-subframe spreading code is associated with these resources, and the resources are not used by a plurality of terminals 200 at the same time. This also applies to the other multiple-subframe spreading code sequences #1 to #3 illustrated in FIG. 11B.

In FIG. 11B, if the cyclic shift difference between neighboring cyclic shifts associated with the same multiple-subframe spreading code sequence is 2 (in the case of the multiple-subframe spreading code sequence #0 or #2), the OCCs which are combined with the cyclic shifts are the same. In contrast, if the cyclic shift difference between neighboring cyclic shifts having the same multiple-subframe spreading code sequence associated therewith is 1 (in the case of the multiple-subframe spreading code sequence #1 or #3), the OCCs which are combined with the cyclic shifts differ from each other.

As described above, by associating the same multiple-subframe spreading code with the DMRSs that use cyclic shift and OCC with low mutual orthogonality, setting of these DMRSs by a plurality of the terminals 200 at the same time can be prevented and, thus, intersymbol interference can be reduced.

Furthermore, as illustrated in FIG. 11B, between the multiple-subframe spreading code #0 (1, 1, 1, 1) corresponding to MSCI=000 and the multiple-subframe spreading code #2 (1, 1, −1, −1) corresponding to MSCI=001, intersymbol interference caused by the movement of the terminal 200 easily occurs. However, as illustrated in FIG. 11B, the difference between the cyclic shifts respectively associated with the multiple-subframe spreading code #0 and the multiple-subframe spreading code #2 is 6, which is a maximum value. By associating a pair of multiple-subframe spreading codes having low mutual orthogonality with a cyclic shift and OCC having high mutual orthogonality in this manner, the intersymbol interference can be reduced, as in the second embodiment.

As described above, according to the present embodiment, if the number of candidates of multiple-subframe spreading codes (the number of usable multiple-subframe spreading codes) is smaller than the number of values that can be represented by a number of bits constituting the existing field for indicating the cyclic shift and the OCC used for DMRS, the cyclic shifts having low mutual orthogonality are associated with one multiple-subframe spreading code. In this manner, intersymbol interference caused by a decrease in the orthogonality between DMRSs can be prevented.

In addition, according to the present embodiment, cyclic shifts having high mutual orthogonality are associated with multiple-subframe spreading codes having low mutual orthogonality. In this manner, coding interference between the DMRSs due to distortion of the orthogonality between the multiple-subframe spreading code sequences caused by the orthogonalization of the DMRS can be prevented.

Furthermore, according to the present embodiment, like the first embodiment, a multiple-subframe spreading code can be shared between the base station 100 and the terminal 200 without increasing the overhead.

Fourth Embodiment

According to the present embodiment, like the third embodiment, description is given with reference to the case in which the number of candidates of the multiple-subframe spreading code (the number of usable multiple-subframe spreading codes) to be indicated to a terminal set in the MTC coverage enhancement mode is smaller than the number of values that can be represented by a number of bits constituting the existing field for indicating the cyclic shift and the OCC used for DMRS.

In the third embodiment, description has been given with reference to the case in which the multiple-subframe spreading code is associated with a plurality of MSCI. In contrast, according to the present embodiment, description is given with reference to the case in which the multiple-subframe spreading codes are associated one to one with MSCIs.

Since the base station and the terminal according to the present embodiment have basic configurations that are the same as those of the base station 100 and the terminal 200 according to the first embodiment, description is given with reference to FIGS. 5 and 6.

According to the present embodiment, as an example, the following case is described. That is, a terminal 200 is set in the MTC coverage enhancement mode, and multiple-subframe spreading using a multiple-subframe spreading code having a sequence length (a code spreading factor) $N_{SF}$=4 is applied when PUSCH repetition transmission is performed. In addition, the existing field used to indicate the cyclic shift and OCC used for DMRS consists of 3 bits.

Like the second embodiment, the base station 100 shares a plurality of combinations of cyclic shift and OCC used for DMRS with the terminal 200, which can be specified for the terminal 200, in advance. In addition, like the second embodiment, the base station 100 shares a plurality of multiple-subframe spreading codes that can be specified for the terminal 200 with the terminal 200 in advance.

In addition, when a Walsh sequence having a sequence length (a spreading factor) $N_{SF}$=4 is used as the multiple-subframe spreading code, the following four multiple-subframe spreading codes can be specified:

0: (1, 1, 1, 1),
1: (1, −1, 1, −1),
2: (1, 1, −1, −1), and
3: (1, −1, −1, 1).

When the spreading factor $N_{SF}$ of the multiple-subframe spreading code=4, the number of the multiple-subframe spreading code sequences is 4. Therefore, the number of bits required for indicating the multiple-subframe spreading code having a spreading factor $N_{SF}$=4 is 2. That is, like the first embodiment, when the existing field (3 bits) for indicating cyclic shift and OCC used for DMRS is used for indicating a multiple-subframe spreading code, only 2 bits out of the 3 bits are needed and, thus, the remaining 1 bit is an unused bit.

Therefore, according to the present embodiment, the base station 100 uses 2 bits of the existing field (3 bits) for indicating cyclic shift and OCC used for DMRS to indicate the MSCI and indicates the multiple-subframe spreading code and cyclic shift and OCC used for DMRS by using the MSCI.

Figures 12A, 12B:
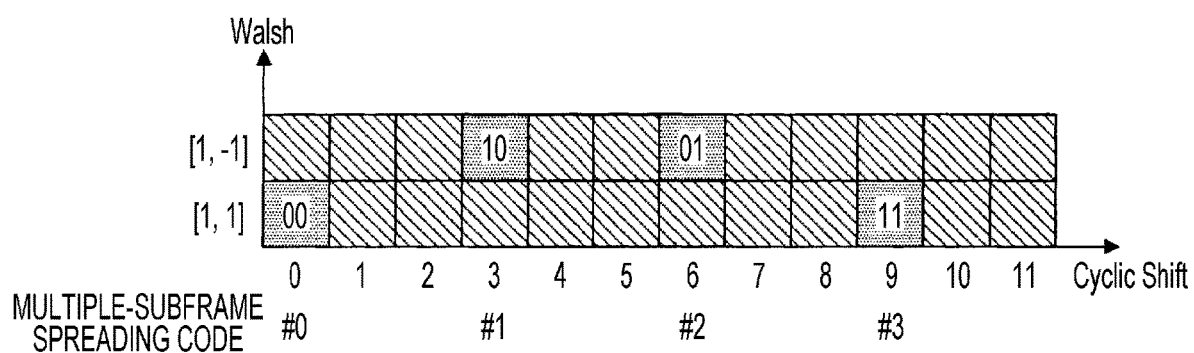
FIG. 12A illustrates an example of an MSCI for indicating a multiple-subframe spreading code and a cyclic shift and an OCC used for DMRS according to a fourth embodiment.
FIG. 12B illustrates a combination of a multiple-subframe spreading code, a cyclic shift, and an OCC indicated by using the MSCI according to the fourth embodiment.

FIG. 12A illustrates an example of a field for indicating the multiple-subframe spreading code and cyclic shift and OCC used for DMRS. In FIGS. 12A and 12B, a multiple-subframe spreading code sequence and a combination of a cyclic shift and an OCC are associated with each of the values (00 to 11) represented by 2 bits, which are required for indicating a multiple-subframe spreading code sequence, of the existing field (3 bits) for Indicating the cyclic shift and OCC used for DMRS.

In addition, like the second embodiment, a pair of multiple-subframe spreading codes having low mutual orthogonality is associated with a DMRS using cyclic shift and OCC having high mutual orthogonality. In this manner, intersymbol interference can be reduced. More specifically, as illustrated in FIG. 12A, two multiple-subframe spreading codes corresponding to the nth column and the (n+2)th column (n=0 to 1) of the Walsh-Hadamard matrix are associated with two cyclic shifts having a maximum difference of 6, respectively. The multiple-subframe spreading code, the cyclic shift, and the OCC which are associated in this manner are associated with an MSCI.

For example, as illustrated in FIG. 12A, of the values (00 to 11) represented by 2 bits constituting the MSCI, MSCI=00 and MSCI=01 having the cyclic shift=0 and cyclic shift=6 associated therewith, respectively, whose difference is a maximum value of 6 are associated with the pair consisting of the multiple-subframe spreading code sequences #0 and #2 (the 0th and 2nd columns of the Walsh-Hadamard matrix) having low mutual orthogonality among the plurality of multiple-subframe spreading code sequences.

Similarly, as illustrated in FIG. 12A, MSCI=10 and MSCI=11 having the cyclic shift=3 and cyclic shift=9 associated therewith, respectively, whose difference is a maximum value of 6 are associated with the pair consisting of the multiple-subframe spreading code sequences #1 and #3 (the 1st and 3rd columns of the Walsh-Hadamard matrix) having low mutual orthogonality among the plurality of multiple-subframe spreading code sequences.

FIG. 12B illustrates a multiple-subframe spreading code and a combination of the cyclic shift and OCC associated with each of the values (00 to 11) of the MSCI illustrated in FIG. 12A on the cyclic shift axis and the orthogonal code axis.

As illustrated in FIG. 12B, between the multiple-subframe spreading code #0 (1, 1, 1, 1) corresponding to MSCI=00 and the multiple-subframe spreading code #2 (1, 1, −1, −1) corresponding to MSCI=01, intersymbol interference caused by the movement of the terminal 200 easily occurs. However, as illustrated in FIG. 12B, the difference between the cyclic shifts respectively associated with the multiple-subframe spreading code #0 and the multiple-subframe spreading code #2 is 6, which is a maximum value.

In this manner, by associating the pair of multiple-subframe spreading codes having low mutual orthogonality with the cyclic shift and OCC having high mutual orthogonality, intersymbol interference can be reduced.

In addition, according to the present embodiment, in the existing fields (3 bits) used for indicating the cyclic shift and the OCC used for DMRS, 2 bits are used for an MSCI. The remaining 1 bit is used as a known bit by both the base station 100 and the terminal 200 (that is, a virtual CRC). That is, the existing field (3 bits) for indicating the cyclic shift and OCC used for DMRS is formed from the MSCI and virtual CRC.

The terminal 200 (extraction unit 205) de-masks (or descrambles) the CRC bits added to the DCI that may be destined for the terminal 200 itself by using the terminal ID thereof and blind-decodes the PDCCH by using the CRC bit string and the virtual CRC bit. Thus, the terminal 200 detects the DCI destined therefor.

In this manner, the terminal 200 can use the virtual CRC in addition to the check result of the CRC bits in determining whether the received DCI is destined therefor. For example, even when the result of checking the CRC bits subjected to descrambling using the terminal ID of the terminal 200 is successful, the terminal 200 can ignore the DCI if the virtual CRC bit included in the received DCI is not the same as the known bit.

Thus, detection error of control information by the terminal 200 can be reduced. Reduction of detection error contributes to expansion of the coverage.

Each of the embodiments of the present disclosure has been described above.

Note that the values of the number of repetition, the cyclic shifts used for DMRS, the sequence lengths of OCC, and the sequence lengths of multiple-subframe spreading code sequence used in the above embodiments are only examples and are not limited to the above-described values.

Furthermore, the present disclosure can be realized by software, hardware, or software in cooperation with hardware.

It should be noted that each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

In addition, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

Furthermore, if future integrated circuit technology replaces LSIs as a result of the advancement of semiconductor technology or other derivative technology, the functional blocks could be integrated using the future integrated circuit technology. Biotechnology can also be applied.

According to the present disclosure, a communication device includes a control unit that selects, from among a plurality of code sequences orthogonal to one another, one code sequence by which an uplink signal including a demodulation reference signal subjected to repetition across a plurality of subframes is multiplied and a transmitting unit that transmits, to a terminal for which transmission of the uplink signal subjected to the repetition is configured, information indicating the selected code sequence by using a field for indicating a cyclic shift and an orthogonal code used for the demodulation reference signal.

In addition, in the communication device according to the present disclosure, the plurality of code sequences are associated one to one with a plurality of values indicated by using bits constituting the field.

In addition, in the communication device according to the present disclosure, the plurality of values indicated by using bits constituting the field are associated one to one with a plurality of combinations of the code sequence, the cyclic shift, and the orthogonal sequence.

In addition, in the communication device according to the present disclosure, among a plurality of values indicated by using the bits constituting the field, two values which are associated one to one with two cyclic shifts having a maximum cyclic shift difference are associated with two code sequences having low mutual orthogonality among the plurality of code sequences.

In addition, in the communication device according to the present disclosure, if the number of the plurality of code sequences is smaller than the number of values indicated by using bits constituting the field, one code sequence is associated with two of the values that are associated with neighboring cyclic shifts.

In addition, in the communication device according to the present disclosure, if the number of the plurality of code sequences is smaller than the number of values indicated by using bits constituting the field, a plurality of values indicated by using, among the bits, a number of bits required for indicating one code sequence among the plurality of code sequences are associated one to one with a plurality of combinations of the code sequence, the cyclic shift, and the orthogonal sequence and the bits other than the bits required for indicating the code sequence are known bits.

In addition, in the communication device according to the present disclosure, components of the selected code sequence are multiplied by the uplink signals each in one of the plurality of subframes, respectively.

Furthermore, according to the present disclosure, a communication device includes a receiving unit that receives information indicating one of a plurality of code sequences orthogonal to one another by using a field for indicating a cyclic shift and an orthogonal sequence used for a demodulation reference signal and a spreading unit that multiplies an uplink signal including the demodulation reference signal subjected to repetition across a plurality of subframes by the code sequence indicated by the information.

In addition, in the communication device according to the present disclosure, the spreading unit multiplies the uplink signals each in one of the plurality of subframes by components of the selected code sequence, respectively.

Furthermore, according to the present disclosure, a communication method includes selecting, from among a plurality of code sequences orthogonal to one another, one code sequence by which an uplink signal including a demodulation reference signal subjected to repetition across a plurality of subframes is multiplied and transmitting, to a terminal for which transmission of the uplink signal subjected to the repetition is configured, information indicating the selected code sequence by using a field for indicating a cyclic shift and an orthogonal sequence used for the demodulation reference signal.

Still furthermore, according to the present disclosure, a communication method includes receiving information indicating one of a plurality of code sequences orthogonal to one another by using a field for indicating a cyclic shift and an orthogonal sequence used for a demodulation reference signal and multiplying an uplink signal including the demodulation reference signal subjected to repetition across a plurality of subframes by the code sequence indicated by the information.

An aspect of the present disclosure is useful for a mobile communication system.

What is claimed is:

1. An integrated circuit to control a process, the process comprising:
    receiving downlink control information (DCI) transmitted from a base station to a communication device;
    generating a demodulation reference signal (DMRS) for a physical uplink shared channel (PUSCH) using a combination of a cyclic shift and an orthogonal sequence; and
    transmitting, from the communication device to the base station, the PUSCH and the generated DMRS,
    wherein:
        whether the combination used for generating the DMRS is dynamically changed or not depends on whether the communication device is configured in a coverage enhancement mode;
        when the communication device is configured in the coverage enhancement mode, in which the PUSCH is allowed to be transmitted with repetitions spanning a plurality of subframes, the combination used for generating the DMRS is fixed and not dynamically changed by the DCI; and
        when the communication device is not configured in the coverage enhancement mode, the combination used for generating the DMRS is dynamically changed by the DCI.

2. The integrated circuit according to claim 1, wherein when the communication device is configured in the coverage enhancement mode, the process comprises multiplying the PUSCH transmitted with repetitions spanning the plurality of subframes by one code sequence out of a plurality of code sequences.

3. The integrated circuit according to claim 2, wherein said one code sequence is determined using a field for indicating the combination used for the DMRS in the DCI.

4. The integrated circuit according to claim 3, wherein the plurality of code sequences are respectively associated with a plurality of values indicated by bits constituting the field.

5. The integrated circuit according to claim 4, wherein the plurality of values indicated by bits constituting the field are respectively associated with a plurality of combinations of the code sequences, cyclic shifts, and orthogonal sequences.

6. The integrated circuit according to claim 1, comprising:
    circuitry which, in operation, controls the process;
    at least one input coupled to the circuitry, wherein the at least one input, in operation, inputs data; and
    at least one output coupled to the circuitry, wherein the at least one output, in operation, outputs data.

7. The integrated circuit according to claim 1, wherein when the communication device is configured in the coverage enhancement mode, the combination used for generating the DMRS is fixed by the DCI.

8. The integrated circuit according to claim 1, wherein when the communication device is configured in the coverage enhancement mode, the combination used for generating the DMRS is determined in advance between the communication device and the base station.

9. The integrated circuit according to claim 1, wherein when the communication device is configured in the coverage enhancement mode, the transmitting includes transmitting the PUSCH and the DMRS in a narrow band.

10. The integrated circuit according to claim 1, wherein the transmitting includes transmitting the PUSCH and the DMRS using a frequency hopping in a narrow band.

11. An integrated circuit comprising circuitry, which, in operation:
    controls reception of downlink control information (DCI) transmitted from a base station to a communication device;
    generates a demodulation reference signal (DMRS) for a physical uplink shared channel (PUSCH) using a combination of a cyclic shift and an orthogonal sequence; and
    controls transmission, from the communication device to the base station, of the PUSCH and the generated DMRS,
    wherein:
        whether the combination used for generating the DMRS is dynamically changed or not depends on whether the communication device is configured in a coverage enhancement mode;
        when the communication device is configured in the coverage enhancement mode, in which the PUSCH is allowed to be transmitted with repetitions spanning a plurality of subframes, the combination used for generating the DMRS is fixed and not dynamically changed by the DCI; and
        when the communication device is not configured in the coverage enhancement mode, the combination used for generating the DMRS is dynamically changed by the DCI.

12. The integrated circuit according to claim 11, wherein when the communication device is configured in the coverage enhancement mode, the circuitry, in operation, multiplies the PUSCH transmitted with repetitions spanning the plurality of subframes by one code sequence out of a plurality of code sequences.

13. The integrated circuit according to claim 12, wherein said one code sequence is determined using a field for indicating the combination used for the DMRS in the DCI.

14. The integrated circuit according to claim 13, wherein the plurality of code sequences are respectively associated with a plurality of values indicated by bits constituting the field.

15. The integrated circuit according to claim 14, wherein the plurality of values indicated by bits constituting the field are respectively associated with a plurality of combinations of the code sequences, cyclic shifts, and orthogonal sequences.

16. The integrated circuit according to claim 11, comprising:
    at least one input coupled to the circuitry, wherein the at least one input, in operation, inputs data; and
    at least one output coupled to the circuitry, wherein the at least one output, in operation, outputs data.

17. The integrated circuit according to claim 11, wherein when the communication device is configured in the coverage enhancement mode, the combination used for generating the DMRS is fixed by the DCI.

18. The integrated circuit according to claim 11, wherein when the communication device is configured in the coverage enhancement mode, the combination used for generating the DMRS is determined in advance between the communication device and the base station.

19. The integrated circuit according to claim 11, wherein when the communication device is configured in the coverage enhancement mode, the transmission includes transmission of the PUSCH and the DMRS in a narrow band.

20. The integrated circuit according to claim 11, wherein the transmission includes transmission of the PUSCH and the DMRS using a frequency hopping in a narrow band.

* * * * *